US00RE45519E

(19) United States
(12) Reissued Patent
Rowatt

(10) Patent Number: US RE45,519 E
(45) Date of Reissued Patent: May 19, 2015

(54) QUARTER WAVE PLATE POLARIZER WITH TWO PHASE-SHIFTING PORTIONS

(71) Applicant: MBDA UK LIMITED, Stevenage, Hertfordshire (GB)

(72) Inventor: Charles Anthony Rowatt, Edgeware (GB)

(73) Assignee: MBDA UK Limited, Hertfordshire (GB)

(21) Appl. No.: 13/846,709

(22) Filed: Mar. 18, 2013

Related U.S. Patent Documents

Reissue of:
(64) Patent No.: 6,356,164
Issued: Mar. 12, 2002
Appl. No.: 09/481,666
Filed: Jan. 12, 2000

(30) Foreign Application Priority Data

Jan. 15, 1999 (GB) ..... 9900763

(51) Int. Cl.
*H01P 1/17* (2006.01)
*H01P 1/18* (2006.01)

(52) U.S. Cl.
CPC ..... *H01P 1/172* (2013.01)

(58) Field of Classification Search
CPC ..... H01P 1/172
USPC ..... 333/21 A, 157, 33–35, 248
See application file for complete search history.

(56) References Cited

U.S. PATENT DOCUMENTS

| | | | | | |
|---|---|---|---|---|---|
| 4,156,213 | A | * | 5/1979 | Shindo et al. | 333/21 A |
| 4,551,692 | A | * | 11/1985 | Smith | 333/21 A |
| 4,568,943 | A | | 2/1986 | Bowman | |

FOREIGN PATENT DOCUMENTS

| | | | | | |
|---|---|---|---|---|---|
| DE | 1081075 | | * | 5/1960 | 333/21 A |
| EP | 0 569 015 | A2 | | 11/1993 | |
| GB | 1 605 126 | A | | 12/1981 | |
| JP | 53-135550 | | * | 11/1978 | H01P 1/20 |
| JP | 53-1355550 | | | 11/1978 | |
| JP | 2-260901 | A | | 10/1990 | |

OTHER PUBLICATIONS

Goldstone, L.L., "Circular Polarizer for Microwave Transmission"; IBM Technical Disclosure Bulletin vol. 22, No. 9 Feb. 1980 XP-002174829.

(Continued)

*Primary Examiner* — Robert Pascal
*Assistant Examiner* — Gerald Stevens
(74) *Attorney, Agent, or Firm* — Scully, Scott, Murphy & Presser, PC

(57) ABSTRACT

A right circular cylindrical body of an isotropic dielectric such as a cross-linked styrene copolymer, has respective pluralities of mutually parallel grooves formed in its axial end faces, spaced apart by an intermediate portion whose dimension c is a half wavelength. The axial lengths a, b of the grooves are such that when a wave passes through the body, a quarter wavelength phase difference is produced between a component of a wave having its E-vector parallel to the grooves and a component of the wave having its E-vector orthogonal to the grooves. Alternatively the plate may consist of two or more discrete bodies whose grooves are dimensioned to produce a total differential phase shift of one quarter wavelength.

10 Claims, 4 Drawing Sheets

(56) References Cited

OTHER PUBLICATIONS

European Communication dated Jan. 19, 2010 for Application No. 07 075 901.4-1248 (6 pgs.).
Collin, R. E., et al., "The Design of Quarter-Wave Matching Layers for Dielectric Surfaces" Monograph No. 149 R, Sep. 1955; Pc. IEE Part C vol. 103 1956 (pp. 153-158).
European Communication date Oct. 4, 2001 for EP 99310081.7-2220; and European Search Report completion dated Aug. 14, 2001.
Rogers Corporation Advance Circuit materials "RT/duroid 5870/5880 High Frequency Laminates" (Data Sheet 2 pgs.).
Kirschbaum, H.S., et al., "A Method of Producing Broad-Band Circular Polarization Employing an Anisotropic Dielectric" IRE Transactions on Microwave Theory and Techniques, 1957, p. 199-203.
European Communication date Feb. 26, 2008 for EP 07075901.4-1248; and European Search Report completion dated Feb. 19, 2008 (2 pgs); with Annex to European Search Report (4 pgs).
Search Report dated May 13, 1999 for GB 9900763.5 (1 pg).

* cited by examiner

QUARTER WAVE PLATE POLARIZER WITH TWO PHASE-SHIFTING PORTIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This invention relates to quarter wave plates. It particularly relates to quarter wave plates for use at radio frequencies.

2. Description of the Related Art

As is known to those skilled in the art, a quarter wave plate is a component which produces a phase shift of $\pi/2$ radians, i.e. one quarter wavelength (or an odd integer multiple thereof) between orthogonal components of electromagnetic radiation.

Applications of such quarter wave plates include the conversion of unpolarized radiation to circularly-polarized radiation and conversion of plane-polarized radiation to helically-polarized radiation.

It is known to construct a quarter wave plate for use at radio frequencies by using a dielectric. material having an anisotropic relative dielectric constant. Two parallel faces are made on a piece of the anisotropic material. The distance between the faces is such that, in traversing the thickness of the plate, for radiation at the nominal frequency at which the plate is to be used, components in the direction parallel to the axis of the greater dielectric constant undergo a phase shift of one quarter wavelength relative to components in an orthogonal axis having the lesser dielectric constant. One type of material having the necessary anisotropic properties is sapphire. While such plates have been found to produce the necessary phase shift, they suffer a number of disadvantages. Sapphire is relatively "hard" material, i.e., it has a relatively high dielectric constant relative to air. This results in losses by reflection due to the mis-match between free space and the relatively high dielectric constant sapphire. The problem of this mis-match has been addressed by providing anti-reflecting coatings in the conventional manner. While this approach has generally proved satisfactory, problems have arisen from poor adhesion of the coatings to the sapphire. The resulting structure has also been found to have a relatively narrow bandwidth.

SUMMARY OF THE INVENTION

It is an object of the present invention to provide a quarter wave plate in which the disadvantages of the prior art are ameliorated.

The present invention provides a quarter wave plate comprising at least one body of dielectric material, each said body having respective first and second faces on opposite sides thereof; each such body consisting of a respective first portion consisting of a respective first number of parallel grooves extending inwardly of said respective first face; a respective second portion consisting of a respective second number of parallel grooves extending inwardly of said respective second face and aligned with the grooves of said respective first number of grooves; and a respective third portion defined between said respective first and second portions.

BRIEF DESCRIPTION OF THE DRAWINGS

The invention will now be described by way of non-limiting example only, with reference to the drawings in which.

DETAILED DESCRIPTION OF THE PREFERRED EMBODIMENTS

Before describing the embodiments it should be made clear for the avoidance of doubt that, when referring to the relative dielectric constant of a material, "soft" refers to materials having a low dielectric constant, and "hard" refers to materials having a high dielectric constant. For the purposes of this specification, a soft material is one having a relative dielectric constant less than 5 and a hard material is one having a relative dielectric constant greater than 5. The terms "hard" and "soft" in this context do not necessarily mean that the materials in question are also hard or soft in a physical sense.

Figure 1:
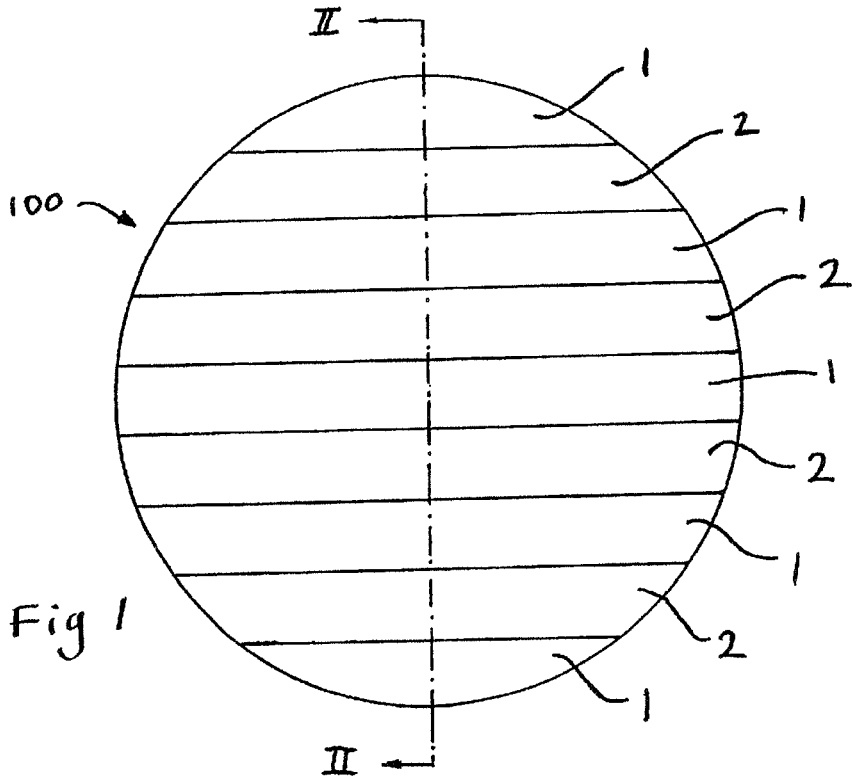
FIG. 1 shows an end elevation of a first quarter wave plate.
Figure 2:
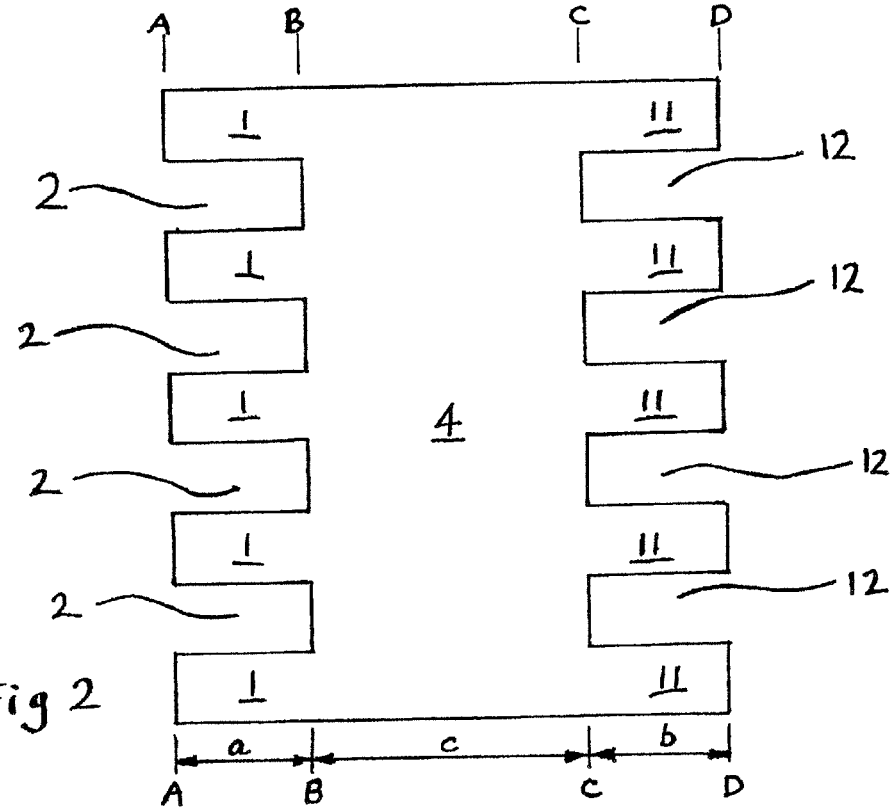
FIG. 2 shows a sectioned view of FIG. 1 along the line II-II.
Figure 3:
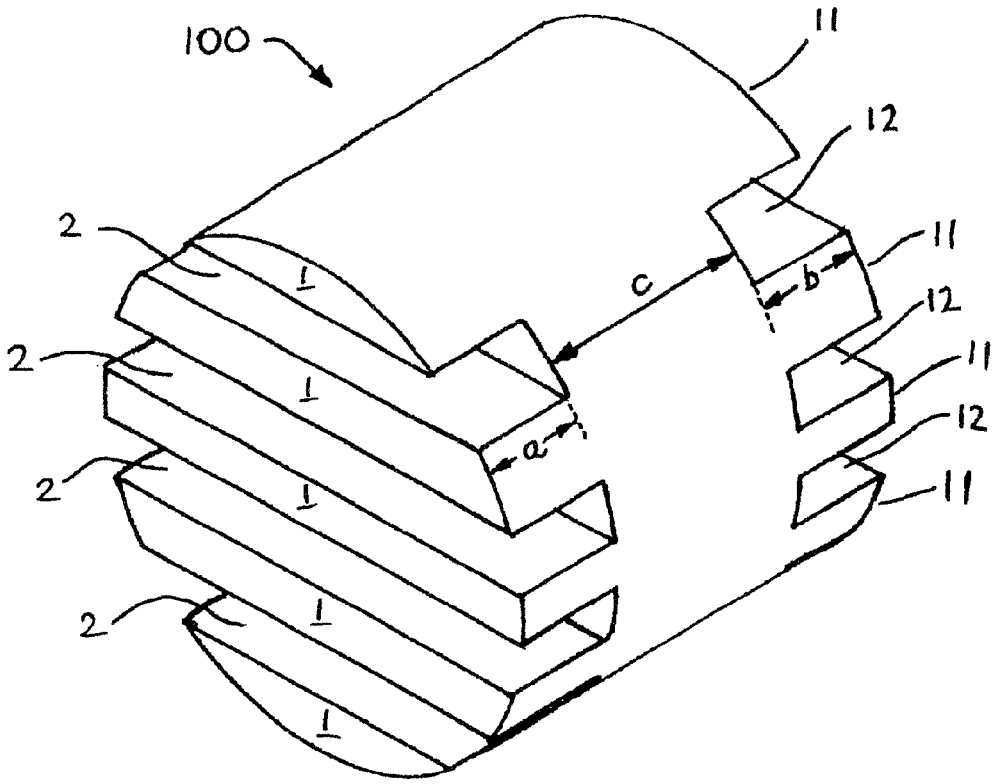
FIG. 3 shows an isometric view of the first quarter wave plate.

Referring to FIGS. 1, 2 and 3 of the drawings, a quarter wave plate 100 is constructed of a "soft" isotropic dielectric comprising a cross-linked styrene copolymer having a relative dielectric constant of about 2.5 at its design frequency. The plate is in the general form of a right circular cylinder having a first plurality of grooves 2 formed in one end face leaving a first plurality of lands 1 therebetween, and a second plurality of grooves 12 formed in the opposite face having a second plurality of lands 11 therebetween, the first plurality of grooves 2 being parallel with the second plurality of grooves 12.

The first plurality of lands 1 and grooves 2 constitute a first region delimited by lines A-A and B-B and having an axial length a equal to the depth of the grooves 2. The second plurality of lands 11 and grooves 12 constitute a second region delimited by lines C-C and D-D and having an axial length b equal to the depth of the grooves 12.

The third region delimited by lines B-B and C-C constitutes a third region having an axial length c.

The sum of axial lengths a and b is such that a wave traversing the distance a+b through the isotropic dielectric exhibits a quarter wave length phase shift with respect to a wave traveling the distance a+b through the medium filling the grooves. In the present embodiment this medium is air. In the present embodiment the wave plate is completely reflection symmetric about its center and the first region is identical with the second region. Thus the impedance of the first region at plane B-B is the same as the impedance of the second region at plane C-C. The length c of the third region is nominally one-half wavelength of the design frequency. A half wavelength structure has the property that, whatever impedance is presented to one end, that impedance appears unchanged at the other end and thus the half wave central region effectively couples B-B directly to C-C. As the impedance at plane B-B is the same as the impedance at plane C-C, theoretically a perfect impedance match results, with no loss by reflection at surfaces B-B or C-C. By designing the input impedances of the first and second structures for minimum reflection loss at surfaces A-A or D-D, the loss by reflection of energy traversing the quarter wave plate can be minimized. The reflectivity for input waves whose E-vector is parallel to the grooves is preferably as close as possible to the reflectivity for input waves whose E-vector is orthogonal to the grooves. This preserves the amplitude relationship between orthogonal components. By allowing plane polarized radiation to impinge on the structure with its E-vector at 45 degrees to the axis of the grooves, the two orthogonal components will emerge with equal amplitudes, thereby ensuring that circular (not elliptical) polarized radiation results.

Details of the procedure for determining the dimensions of the first and second sections will now be given.

A known method of providing a substantially reflection-free transformation between media having different characteristic impedances $Z_1$, $Z_2$ involves the provision between the media of a quarter-wavelength section (i.e., a section having a length of one quarter wavelength at the design frequency) having a characteristic impedance $Z_3$ which is the square root of the product of the two impedances, i.e., $$Z_3=\sqrt{Z_1Z_2}$$

The publication "The Design Of Quarter Wave Matching Layers For Dielectric Surfaces" by R. E. Collin and J. Brown, (Proc, IEE Part C Vol. 103, 1956, pp. 153-158), teaches the design of structures having an electrical length of one quarter wavelength for providing a good impedance match between free space and a dielectric by providing slots in the surface of the dielectric at its interface with free space. The design techniques described in this prior art to construct impedance transformers, can be used to design the radial dimensions of the grooves of quarter wave plates in accordance with the present invention.

The first step is to determine the dimensions of the grooves which would be necessary to construct a quarter wave matching layer between free space and the dielectric material of which the quarter wave plate is to be constructed, using the design criteria given in the Collin et al. paper, supra.

The next step is to determine the axial groove length 1 which would be necessary to produce a quarter wavelength phase shift between a wave traveling in the dielectric and a wave traveling the same distance in free space. Halving the length thus determined gives the respective axial depths a, b of the slots, i.e., a=b=½. Dimension c is nominally the length of one half wavelength of the design frequency in the dielectric medium. Applicants found that the making of dimension c exactly equal to one-half wavelength did not produce the minimum reflection in practice. Applicants found that varying dimension c of the third section allowed a fine tuning of the reflection coefficient of the quarter wave plate. An estimation of the exact dimensions can be made by computer modeling, or empirically determined by simply making a number of structures which are identical in all respects other than dimension c, and determining by actual tests the dimension c giving the best reflection coefficient.

The resulting structure may be considered to have an impedance at plane A-A and D-D providing a good match to free space, and impedances at planes B-B and C-C which are a function of the lengths a and b. While these latter impedances will in general not be such as to provide a good impedance match to the dielectric, this does not matter as the half-wavelength third section of length c effectively brings plane B-B coincident with plane C-C, thereby providing an impedance match between the first and second sections. Varying length c allows fine tuning of the reflection coefficients at planes A-A and D-D. The sum of lengths a and b is such as to provide the necessary anisotropic birefringent dielectric properties necessary for the structure to behave as a quarter wave plate.

Additional degrees of design freedom can be obtained by using a compound arrangement consisting of two or more discrete plates, the plates being such that a total differential phase shift of one quarter wavelength (or an odd integer multiple thereof) is imported to orthogonal components of a wave in its passage through the plates. The distance between the plates and the nature of the dielectric therebetween provides additional degrees of design freedom.

Figure 4:
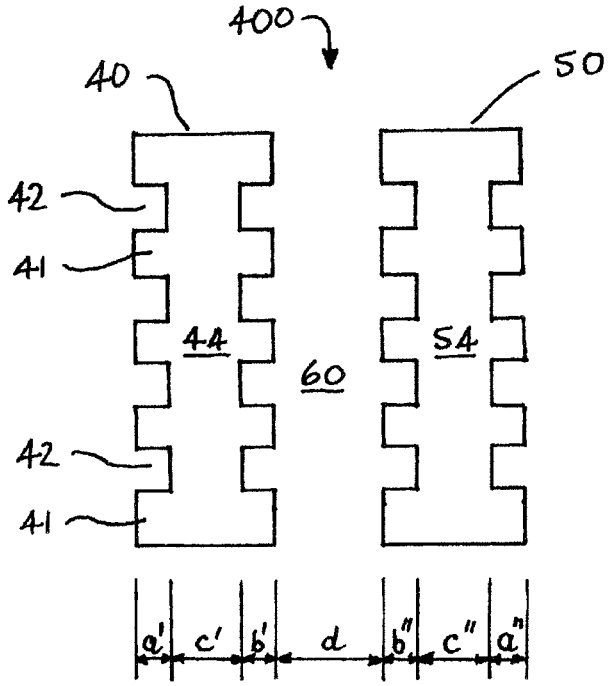
FIG. 4 shows a second embodiment of the invention.

FIG. 4 shows schematically a quarter wave plate 400 which consists of first and second eighth-wave plates 40, 50 spaced apart by a gap 60. In the present embodiment the gap consists of air, and the same medium (air) is present on both sides of the quarter wave plate. This permits the use of a symmetrical arrangement in which the eighth-wave plates 40 and 50 are of identical design. Each eighth-wave plate 40, 50 is of similar configuration to the quarter-wave plate of the first embodiment, in that each face is provided with a plurality of parallel grooves, however whereas in the first embodiment the groove depth was such as to produce a one-eighth differential phase shift in each of regions a and b, in the present embodiment the depth is such as to produce a one-sixteenth wavelength differential phase shift in each of regions a', b', b" and a". It will be seen that the total differential phase shift is four times one-sixteenth, i.e., one quarter wavelength. As in the first embodiment the axial dimensions c', c" of regions 44, 54 are each nominally equal to an integer multiple of one half wavelength; however, these dimensions and the dimension d of the gap 60 can be varied to optimize parameters such as the reflection coefficient.

Figure 5:
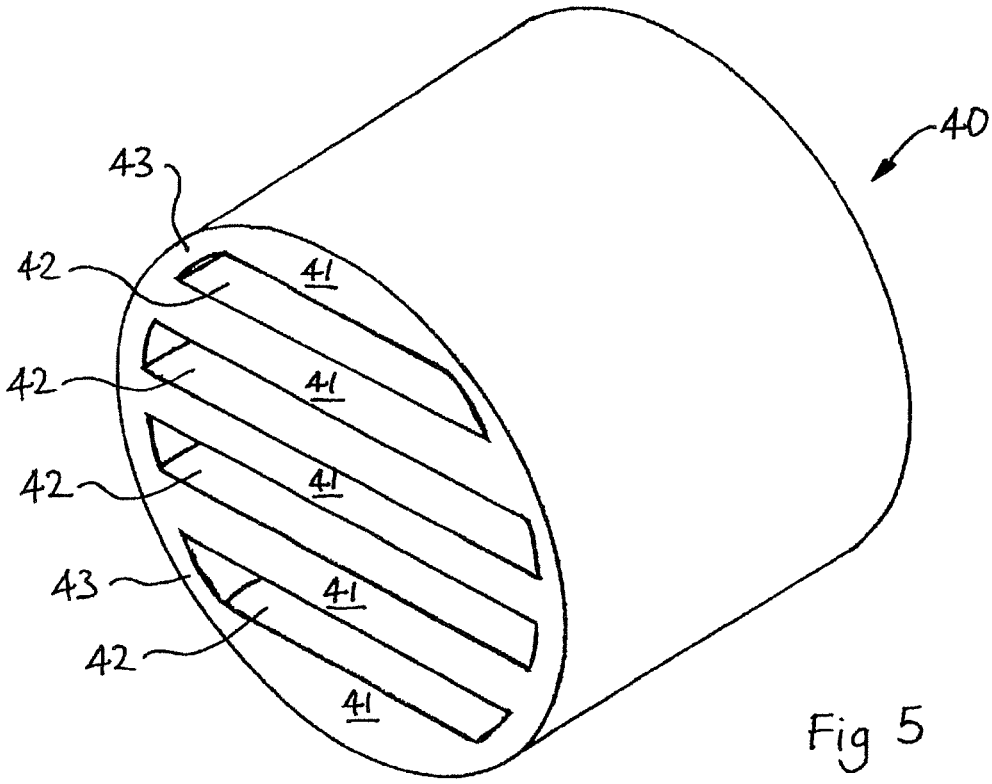
FIG. 5 shows an isometric view of one of the plates of FIG. 4.
Figure 6:
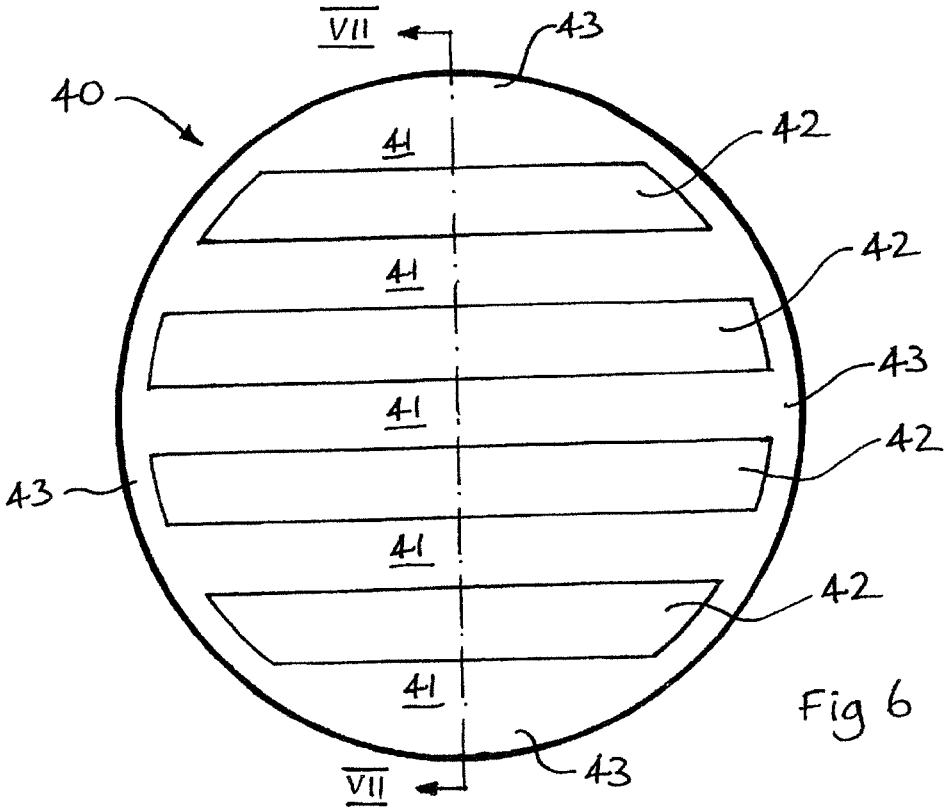
FIG. 6 shows an end deviation of FIG. 5.
Figure 7:
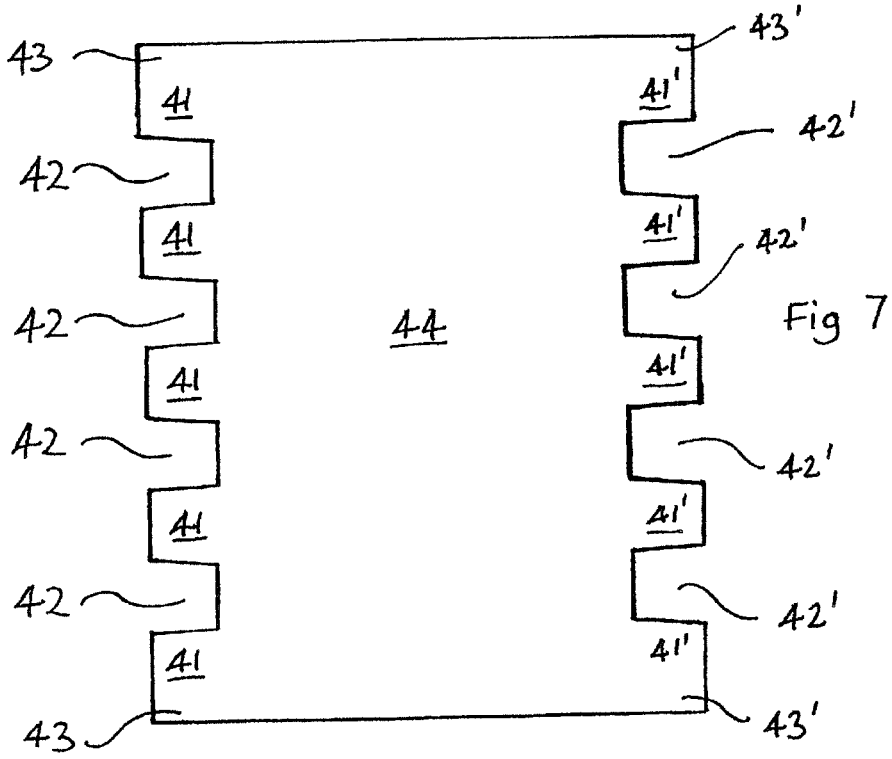
FIG. 7 shows a sectioned view of FIG. 6 along the line VII-VII.

One of the eighth-wave plates 40 will now be described with reference to FIGS. 5, 6 and 7. As noted above, the other plate 50 is identical. Plate 50 is of generally right circular cylindrical form. Each end of the cylinder has a plurality of spaced-apart parallel grooves 42, 42' formed in the ends thereof, the grooves being defined by lands 41, 41'. In the present embodiment the plate 40 is produced by molding and to provide mechanical strength the grooves 42, 42' do not extend completely across the end faces. Instead a continuous circumferential annular region 43, 43' is left which supports and protects the radial ends of the lands 41, 41'. The grooved regions are sufficiently large that they intercept all the electromagnetic radiation whose polarization is to be modified. Thus the presence of the circumferential annular regions 43, 43' have no effect on the operation of the plate in use. Because this embodiment is designed to be manufactured by molding, the lateral walls of the grooves 42, 42' are not exactly perpendicular to the end faces of the cylinder, but are slightly tapered to facilitate release from the mold in which the plate is manufactured. This taper is shown in somewhat exaggerated from in the schematic view of FIG. 7 for clarity.

In a modification, not shown, the medium in the intermediate space 60 is not air but comprises a material of a dielectric constant other than unity. This material may be the same as the material filling the grooves in the facing regions b', b".

In a further modification, not shown, a quarter wave plate in accordance with the invention may consist of more than two plates. The differential phase shift contributed by each plate is such that the total differential phase shift is an odd integer multiple of one quarter wavelength. Thus a three plate arrangement could have three identical plates, each producing a one-twelfth wavelength phase shift, or one plate having a one-eighth phase shift in conjunction with two plates each having a one-sixteenth phase shift, or any other combination producing a total differential phase shift of one quarter wavelength. While more complex than a two-plate arrangement, the extra gaps between plates provide extra degrees of design freedom.

While the grooves 2, 12 of the first embodiment are shown as extending entirely across the structure, this is not necessary. It is only necessary for the grooves to extend across that part of the structure through which electromagnetic radiation has to pass. Thus the periphery of each end face may be continuous, providing mechanical support for the ends of lands 1, 11 as in the second embodiment. Similarly, the grooves of the second embodiment may extend completely across the end faces as in the first embodiment.

It is not necessary for the total phase shift provided by the grooved sections to be one quarter wavelength. Any odd integer multiple of quarter wavelengths will suffice.

It is not necessary for the intermediate sections to be one half-wavelength (nominal). Any integer multiple of half wavelengths will suffice.

While the described embodiments employs a "soft" substrate having a low dielectric constant, material of any dielectric constant may be employed.

While the described embodiments provide quarter wave plates for use in air, the invention can also be performed where the dielectric interfaces with a medium other than air and having a relative dielectric constant other than unity, the relevant dimensions being changed according to the dielectric constant of the medium as to give the necessary differential phase shift.

While the described embodiments are quarter wave plates in which the same medium is present at both axial ends, the invention can also be performed where different media are present at opposite ends, e.g., air at one end and oil at the other end. The dimensions of the slots at each end are then of different design so as to provide impedance matching between the respective media and the dielectric. Thus in an embodiment physically consisting of a single plate, the sum of lengths a and b is such to provide the necessary phase shift. It is to be noted that the paths to be compared now comprise on the one hand a path via the dielectric, and on the other hand a path partly in one medium and partly in the other medium. The actual lengths of a and b are chosen so as to present the same impedances at intermediate surfaces B-B and C-C, fine tuning being effected by varying dimension c as before. Similar considerations apply, mutatis mutandis, to arrangements physically consisting of more than one plate.

The grooves may be provided by any convenient method appropriate to the dielectric material used, e.g., milling, casting or grinding.

While the embodiment depicts a circular cylindrical structure, the structure may be any shape appropriate to the application or structure in which the device is to be employed.

I claim:

1. A quarter wave plate, comprising:

at least one body of dielectric material, said at least one body having respective first and second *end* faces on opposite sides thereof[, and including i)]*; the first and second end faces each having a respective reflection coefficient, said at least one body including:* a [respective] first portion for providing a phase shift between *first and second* orthogonal components of an electromagnetic wave traversing the plate, and including a [respective] *plurality of* first [number of] parallel grooves extending inwardly of said [respective] first *end* face; [ii)]

a [respective] second portion for providing a phase shift between the *first and second* orthogonal components of the electromagnetic wave, and including a [respective] *plurality of* second [number of] parallel grooves extending inwardly of said [respective] second *end* face and aligned with [the grooves of] said [respective] *plurality of* first [number of] *parallel* grooves; and [iii)]

a [respective] third portion defined between said respective first and second portions,

*wherein respective depths of the plurality of first and second parallel grooves are configured to produce the phase shifts of an odd integer multiple of quarter wavelengths between said first and second orthogonal components of the electromagnetic wave traversing the plate, the first component having an E-vector parallel to the plurality of first and second parallel grooves, and the second component having an E-vector perpendicular to the plurality of first and second parallel grooves,*

*wherein the dielectric material has a relative dielectric constant less than 5, and*

*wherein a length of the third portion is selected to differ from a half-wavelength by an amount to adjust the respective reflection coefficient at the first and second end faces.*

[2. The quarter wave plate as claimed in claim 1, wherein said first and second grooves have respective depths whose sum is such that a phase difference of an odd integer multiple of quarter wavelengths exists between the orthogonal components of the electromagnetic wave traversing the plate, a first of the components having its E-vector parallel to the grooves, and a second of the components having its E-vector perpendicular to the grooves.]

3. The quarter wave plate as claimed in claim [2] *1*, wherein the [respective grooves of each said respective first plurality of grooves has a] depth [which] *of each first parallel groove* is equal to a depth of [the grooves of each said respective second plurality of grooves] *each second parallel groove*.

4. The quarter wave plate as claimed in claim 3, [in which] *wherein* said [plate] *at least one body* comprises a single [said] body, and wherein the [grooves] *depths* of each of said first and second [pluralities of] *parallel* grooves [have depths such as to] produce a respective phase difference of one-eighth of a wavelength between the first and second orthogonal components of the wave as the wave traverses said first and [said ] second portions, respectively.

5. The quarter wave plate as claimed in claim 3, [in which] said [plate] *at least one body* comprises two [said] bodies, and wherein the [grooves] *depths* of each of said [respective] first and second [pluralities of] *parallel* grooves [have depths such as to] produce a phase difference of one-sixteenth of a wavelength between the first and second orthogonal components of the wave as the wave traverses each said respective first and second portions.

[6. The quarter wave plate as claimed in claim 1 in which each respective third portion has an axial length which is substantially an integer number of half wavelengths of the wave.]

[7. The quarter wave plate as claimed in claim 6 in which the axial length of each respective third portion is substantially one-half wavelength of the wave.]

8. The quarter wave plate as claimed in claim 1, wherein said dielectric material consists of an isotropic dielectric.

9. The quarter wave plate as claimed in claim 1 in which said dielectric material consists of a soft dielectric having a low dielectric constant.

10. The quarter wave plate as claimed in claim 9 in which said dielectric material comprises a cross-linked styrene copolymer.

*11. The quarter wave plate as claimed in claim 1, wherein the plate has a cylindrical structure.*

*12. The quarter wave plate as claimed in claim 1, wherein the at least one body comprises a continuous region that establishes a perimeter of each end face.*

*13. The quarter wave plate as claimed in claim 1, wherein the length of the third portion is an integer of one half wavelength, wherein said integer is an integer other than one.*

* * * * *